US012610330B2

(12) United States Patent
Kim et al.

(10) Patent No.: US 12,610,330 B2
(45) Date of Patent: Apr. 21, 2026

(54) METHOD AND APPARATUS FOR BEAM MANAGEMENT IN COMMUNICATION SYSTEM

(71) Applicant: Electronics and Telecommunications Research Institute, Daejeon (KR)

(72) Inventors: Jung Bin Kim, Daejeon (KR); Won Jin Byun, Daejeon (KR); Joon Gyu Ryu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 698 days.

(21) Appl. No.: 17/880,222

(22) Filed: Aug. 3, 2022

(65) Prior Publication Data

US 2023/0051098 A1      Feb. 16, 2023

(30) Foreign Application Priority Data

Aug. 3, 2021    (KR) ........................ 10-2021-0101809
Jun. 29, 2022    (KR) ........................ 10-2022-0079566

(51) Int. Cl.
  *H04W 56/00*        (2009.01)
  *H04W 76/20*        (2018.01)
  *H04W 84/06*        (2009.01)

(52) U.S. Cl.
  CPC ....... *H04W 56/001* (2013.01); *H04W 56/006* (2013.01); *H04W 76/20* (2018.02); *H04W 84/06* (2013.01)

(58) Field of Classification Search
  CPC . H04W 56/001; H04W 56/006; H04W 76/20; H04W 84/06; H04W 48/16
  See application file for complete search history.

(56) References Cited

U.S. PATENT DOCUMENTS

2012/0155378 A1    6/2012   Kim et al.
2013/0252655 A1    9/2013   Kim et al.
              (Continued)

FOREIGN PATENT DOCUMENTS

JP          2021-61567       4/2021
KR    10-2018-0122963       11/2018
              (Continued)

OTHER PUBLICATIONS

3GPP, "Final Summary of 8.4.4 Other Aspects of NR-NTN", TSG Radio Access Network WG1 Meeting #105e, e-Meeting, May 10-27, 2021.

*Primary Examiner* — Abdullahi Ahmed
(74) *Attorney, Agent, or Firm* — KILE PARK REED & HOUTTEMAN PLLC

(57) ABSTRACT

An operation method of a terminal in a communication system may comprise: receiving, from a satellite, transmission timing information including information on a first transmission timing of a first SSB of each of at least one local cell and information on second transmission timings of second SSBs of sub-cells belonging to each of the at least one local cell; identifying the first transmission timing of the first SSB and the second transmission timings of the second SSBs based on the transmission timing information; attempting to receive the second SSBs when the first SSB is received at the first transmission timing; acquiring cell access information from the second SSBs by receiving the second SSBs; and accessing the satellite by using the acquired cell access information.

18 Claims, 9 Drawing Sheets

(56)         References Cited

U.S. PATENT DOCUMENTS

| 2016/0261334 | A1 |  | 9/2016 | Kim |
|---|---|---|---|---|
| 2019/0246340 | A1 |  | 8/2019 | Jung et al. |
| 2020/0053744 | A1 |  | 2/2020 | Hosseini et al. |
| 2020/0077314 | A1 |  | 3/2020 | Hwang et al. |
| 2020/0120622 | A1 | * | 4/2020 | Yoon .................... H04B 17/318 |
| 2020/0205141 | A1 |  | 6/2020 | Khoshnevisan et al. |
| 2020/0412498 | A1 |  | 12/2020 | Zhang et al. |
| 2020/0413412 | A1 |  | 12/2020 | Kim et al. |
| 2021/0006372 | A1 |  | 1/2021 | Cha et al. |
| 2021/0119697 | A1 | * | 4/2021 | Wang ................... H04B 7/1853 |
| 2021/0136815 | A1 |  | 5/2021 | Kim et al. |
| 2021/0160827 | A1 |  | 5/2021 | Kim et al. |
| 2021/0168574 | A1 |  | 6/2021 | Zhang et al. |
| 2022/0159741 | A1 | * | 5/2022 | Hoang .............. H04W 74/0833 |
| 2023/0084343 | A1 | * | 3/2023 | Berggren ............. H04L 5/0048 |
|  |  |  |  | 370/311 |
| 2023/0117872 | A1 |  | 4/2023 | Ko et al. |
| 2024/0298278 | A1 | * | 9/2024 | Kim ................... H04W 56/0045 |
| 2025/0008450 | A1 | * | 1/2025 | Matsumura ........ H04B 7/06952 |

FOREIGN PATENT DOCUMENTS

| KR |  | 10-2019-0018659 |  | 2/2019 |
|---|---|---|---|---|
| KR |  | 10-2019-0058418 |  | 5/2019 |
| KR |  | 10-2019-0095071 |  | 8/2019 |
| WO |  | 2017/180335 | A1 | 10/2017 |

\* cited by examiner

Start

| | |
|---|---|
| configure a plurality of local cells within a cell | —S801 |
| configure a plurality of sub-cells within a local cell | —S802 |
| configure beams to the local cells and sub-cells | —S803 |
| configure SSBs to the local cells and sub-cells | —S804 |
| configure transmission timings of the SSBs | —S805 |
| transmit configuration information | —S806 |
| transmit transmission timing information | —S807 |

End

FIG. 9

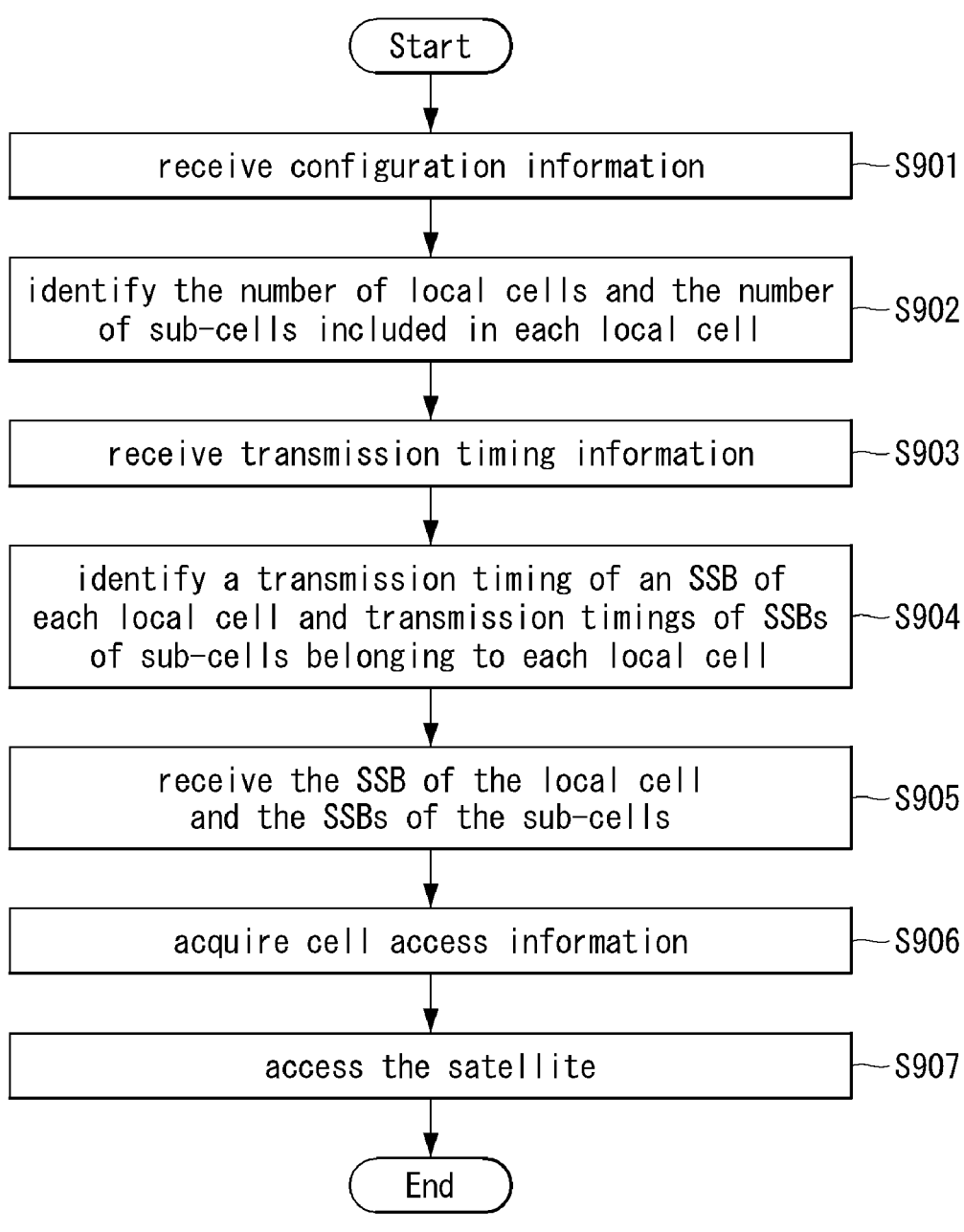

Start receive configuration information — S901 identify the number of local cells and the number of sub-cells included in each local cell — S902 receive transmission timing information — S903 identify a transmission timing of an SSB of each local cell and transmission timings of SSBs of sub-cells belonging to each local cell — S904 receive the SSB of the local cell and the SSBs of the sub-cells — S905 acquire cell access information — S906 access the satellite — S907

End

METHOD AND APPARATUS FOR BEAM MANAGEMENT IN COMMUNICATION SYSTEM

CROSS-REFERENCE TO RELATED APPLICATIONS

This application claims priority to Korean Patent Applications No. 10-2021-0101809, filed on Aug. 3, 2021, and No. 10-2022-0079566, filed on Jun. 29, 2022, with the Korean Intellectual Property Office (KIPO), the entire contents of which are hereby incorporated by reference.

BACKGROUND

1. Technical Field

The present disclosure relates to a technique for beam management in a communication system, and more particularly, to a technique for beam management in a communication system supporting a hierarchical beam structure in which wide beams and narrow beams are transmitted.

2. Related Art

For the processing of rapidly increasing wireless data, a communication network (e.g., new radio (NR) communication system) that uses a frequency band (e.g., a frequency band of 6 GHz or above) higher than that of the long term evolution (LTE) or LTE-Advanced communication system (e.g., a frequency band of 6 GHz or below) is being considered. The NR communication network may support a frequency band of 6 GHz or above as well as a frequency band of 6 GHz or below, and may support various communication services and scenarios compared to the LTE communication network. For example, usage scenarios of the NR communication network may include enhanced Mobile BroadBand (eMBB), Ultra Reliable Low Latency Communication (URLLC), massive Machine Type Communication (mMTC), and the like. Such the NR communication network may provide communication services to terrestrial terminals.

Meanwhile, in recent years, the demand for communication services is increasing not only on the ground, but also on airplanes, drones, and satellites located in non-terrestrial locations. To this end, the NR communication technology is developing in a direction to support a non-terrestrial network (NTN). Accordingly, the NTN may be implemented based on the NR communication technology. For example, the NTN may perform communications between a satellite and a terrestrial communication node or a non-terrestrial communication node (e.g., airplane, drone, etc.) based on the NR technology. In the NTN, the satellite may perform functions of a base station in the NR communication network.

Meanwhile, the satellite may transmit a plurality of beams toward the same spatial region. Accordingly, the satellite may deactivate transmission of some synchronization signal blocks (SSBs). However, when the satellite uses narrow beams respectively allocated to different spatial area, transmission of SSBs for all the narrow beams may be required to cover the entire area within a cell. In this case, the terminal may need to monitor all the SSBs for all the narrow beams within the cell. As a result, the terminal may consume a lot of power. In addition, when the satellite simultaneously transmits wide beams and narrow beams, it may be difficult to maintain a conventional cell coverage due to a limited transmission power.

SUMMARY

In order to solve the above-identified problems, exemplary embodiments of the present disclosure are directed to providing a method and an apparatus for beam management in a communication system supporting a hierarchical beam structure in which wide beams and narrow beams are transmitted.

According to a first exemplary embodiment of the present disclosure for achieving the above-described objective, an operation method of a terminal in a communication system may comprise: receiving, from a satellite, transmission timing information including information on a first transmission timing of a first synchronization signal block (SSB) of each of at least one local cell and information on second transmission timings of second SSBs of sub-cells belonging to each of the at least one local cell; identifying the first transmission timing of the first SSB and the second transmission timings of the second SSBs based on the transmission timing information; attempting to receive the second SSBs when the first SSB is received at the first transmission timing; acquiring cell access information from the second SSBs by receiving the second SSBs; and accessing the satellite by using the acquired cell access information.

When the first SSB is not received at the first transmission timing, a reception operation for the second SSBs may not be performed in the terminal.

The operation method may further comprise: calculating a number of the first transmission timing(s) of the first SSB(s) based on the transmission timing information; calculating a number of the second transmission timings of the second SSBs based on the transmission timing information; estimating a number of the at least one local cell by using the number of the first transmission timing(s) of the first SSB(s); and estimating a number of the sub-cells belonging to each of the at least one local cell by using the number of the second transmission timings of the second SSBs.

The transmission timing information may be received through a system information block type 1 (SIB1) or a radio resource control (RRC) signaling message, and SSB position information included in the SIB1 or RRC signaling message may indicate the transmission timing information.'

The SSB position information may include 8-bit in-one-group information, an n-th bit of the in-one-group information may indicate the first transmission timing, consecutive bits after the n-th bit may indicate the second transmission timings, and n is one of natural numbers 0 to 7.

The SSB position information may include 8-bit in-one-group information and 8-bit group-presence information, a bit of the group-presence information may indicate existence of a group comprising the first SSB and the second SSBs, a first bit of the in-one-group information may indicate the first transmission timing, and consecutive bits after the first bit in the in-one-group information may indicate the second transmission timings.

The SSB position information may include one bitmap among a 4-bit short bitmap, 8-bit medium bitmap, and 64-bit long bitmap, a bit of the one bitmap may indicate the first transmission timing, and consecutive bits after the bit in the one bitmap may indicate the second transmission timings.

According to a second exemplary embodiment of the present disclosure for achieving the above-described objective, a terminal may comprise: a processor; a memory electronically communicating with the processor; and instructions stored in the memory, wherein when executed by the processor, the instructions cause the terminal to: receive, from a satellite, transmission timing information including information on a first transmission timing of a first synchronization signal block (SSB) of each of at least one local cell and information on second transmission timings of second SSBs of sub-cells belonging to each of the at least one local cell; identify the first transmission timing of the first SSB and the second transmission timings of the second SSBs based on the transmission timing information; attempt to receive the second SSBs when the first SSB is received at the first transmission timing; acquire cell access information from the second SSBs by receiving the second SSBs; and access the satellite by using the acquired cell access information.

When the first SSB is not received at the first transmission timing, a reception operation for the second SSBs may not be performed in the terminal.

The instructions may further cause the terminal to: calculate a number of the first transmission timing(s) of the first SSB(s) based on the transmission timing information; calculate a number of the second transmission timings of the second SSBs based on the transmission timing information; estimate a number of the at least one local cell by using the number of the first transmission timing(s) of the first SSB(s); and estimate a number of the sub-cells belonging to each of the at least one local cell by using the number of the second transmission timings of the second SSBs.

The transmission timing information may be received through a system information block type 1 (SIB1) or a radio resource control (RRC) signaling message, and SSB position information included in the SIB1 or RRC signaling message may indicate the transmission timing information.

According to a third exemplary embodiment of the present disclosure for achieving the above-described objective, an operation method of a satellite in a communication system may comprise: configuring a first transmission timing of a first synchronization signal block (SSB) of each of at least one local cell and second transmission timings of second SSBs of sub-cells belonging to each of the at least one local cell; transmitting, to a terminal, information on the first transmission timing of the first SSB and information on the second transmission timings of the second SSBs; transmitting the first SSB at the first transmission timing; and transmitting the second SSBs at the second transmission timings.

The operation method may further comprise, before the configuring of the first transmission timing and the second transmission timings, configuring the at least one local cell within a cell; and configuring the sub-cells in each of the at least one local cell.

The operation method may further comprise: configuring a first type beam in each of the at least one local cell; and configuring a second type beam in each of the sub-cells, wherein a width of the first type beam is wider than a width of the second type beam.

The configuring of the first transmission timing and the second transmission timings may comprise: configuring the first SSB in each of the at least one local cell; configuring the second SSBs in the sub-cells belonging to the each of the at least one local cell; and configuring the first transmission timing and the second transmission timings to be different from each other.

In the configuring the first transmission timing and the second transmission timings to be different from each other, the satellite may configure the first transmission timing to be ahead of the transmission timings of the second SSBs, and sequentially configure the second transmission timings consecutive with the first transmission timing.

The operation method may further comprise transmitting, to the terminal, information on a number of the at least one local cell and information on a number of sub-cells included in each of the at least one local cell.

The information on the first transmission timing(s) of the first SSB(s) may be received through a system information block type 1 (SIB1) or a radio resource control (RRC) signaling message, SSB position information included in the SIB1 or RRC signaling message may indicate the first transmission timing(s), the information on the second transmission timings of the second SSBs may be received through the SIB1 or RRC signaling message, and SSB position information included in the SIB1 or RRC signaling message may indicate the second transmission timings.

According to the exemplary embodiments of the present disclosure, a satellite may configure a plurality of local cells within a cell, and may configure a plurality of sub-cells within each of the local cells. In addition, according to the exemplary embodiments of the present disclosure, the satellite may transmit a local wide beam capable of covering a local cell toward the corresponding local cell. In addition, according to the exemplary embodiments of the present disclosure, the satellite may transmit a narrow beam capable of covering each of the plurality of sub-cells toward the corresponding sub-cell. Accordingly, in such the hierarchical beam structure, the satellite can transmit a signal by concentrating energy on the narrow beams. As a result, the reception performance of the terminal can be improved.

In addition, according to the exemplary embodiments of the present disclosure, the satellite may use information on positions of SSBs within a burst, which is included in serving cell configuration common SIB information in the SIB1, to inform the terminal of information on transmission activation or deactivation of SSBs mapped to the local wide beams and SSBs mapped to the narrow beams. In addition, according to the exemplary embodiments of the present disclosure, the satellite may use information on positions of SSBs within a burst, which is included in serving cell configuration common information of RRC signaling, to inform the terminal of information on transmission activation or deactivation of SSBs mapped to the local wide beams and SSBs mapped to the narrow beams.

BRIEF DESCRIPTION OF DRAWINGS

FIG. 1 is a conceptual diagram illustrating a first exemplary embodiment of a non-terrestrial network.

FIG. 2 is a conceptual diagram illustrating a second exemplary embodiment of a non-terrestrial network.

FIG. 4 is a conceptual diagram illustrating a first exemplary embodiment of a method for transmitting SSBs using a plurality of beams.

FIG. 7 is a conceptual diagram illustrating a first exemplary embodiment of a method for transmitting SSBs in a hierarchical beam structure.

FIG. 9 is a flow chart illustrating a first exemplary embodiment of a beam management method of a terminal in a communication system.

DETAILED DESCRIPTION OF THE EMBODIMENTS

Figure 3:
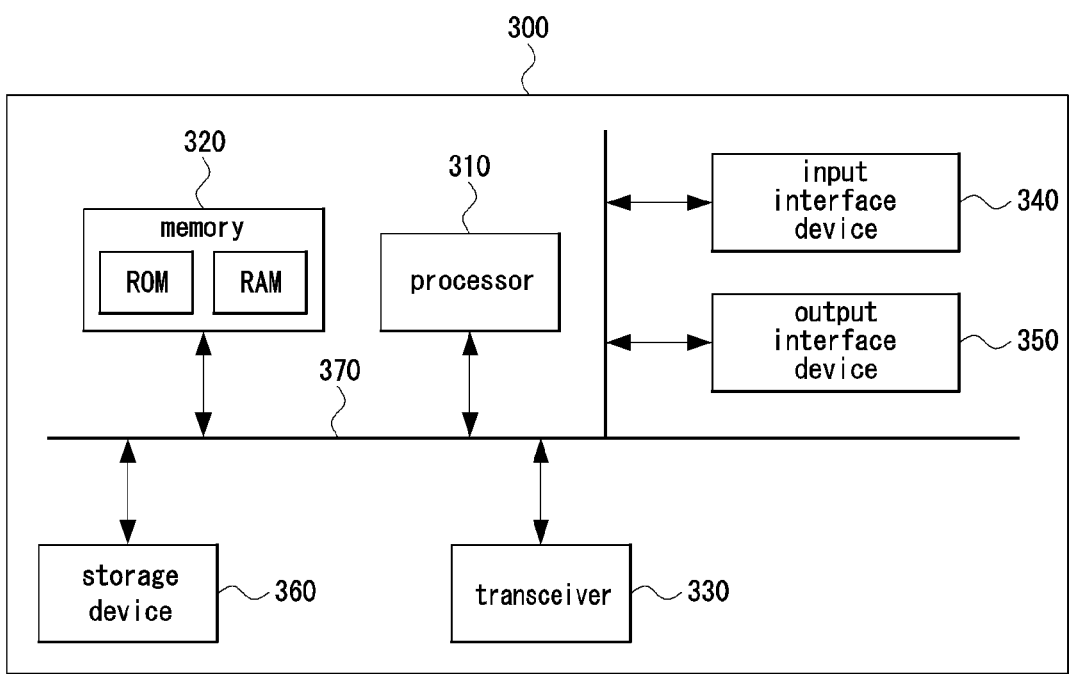
FIG. 3 is a block diagram illustrating an exemplary embodiment of an entity constituting the NTN.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

A communication network to which exemplary embodiments according to the present disclosure are applied will be described. A communication system may be a non-terrestrial network (NTN), 4G communication network (e.g., LTE communication network), 5G communication network (e.g., NR communication network), or the like. The 4G communication network and the 5G communication network may be classified as a terrestrial network.

The NTN may operate based on the LTE technology and/or NR technology. The NTN may support communications in a frequency band of 6 GHz or above as well as a frequency band of 6 GHz or below. The 4G communication network may support communications in a frequency band of 6 GHz or below. The 5G communication network may support communications not only in a frequency band of 6 GHz or below, but also in a frequency band of 6 GHz or above. A communication network to which exemplary embodiments according to the present disclosure are applied is not limited to the content described below, and the exemplary embodiments according to the present disclosure may be applied to various communication networks. Here, a communication network may be used in the same meaning as a communication system.

Figure 1:
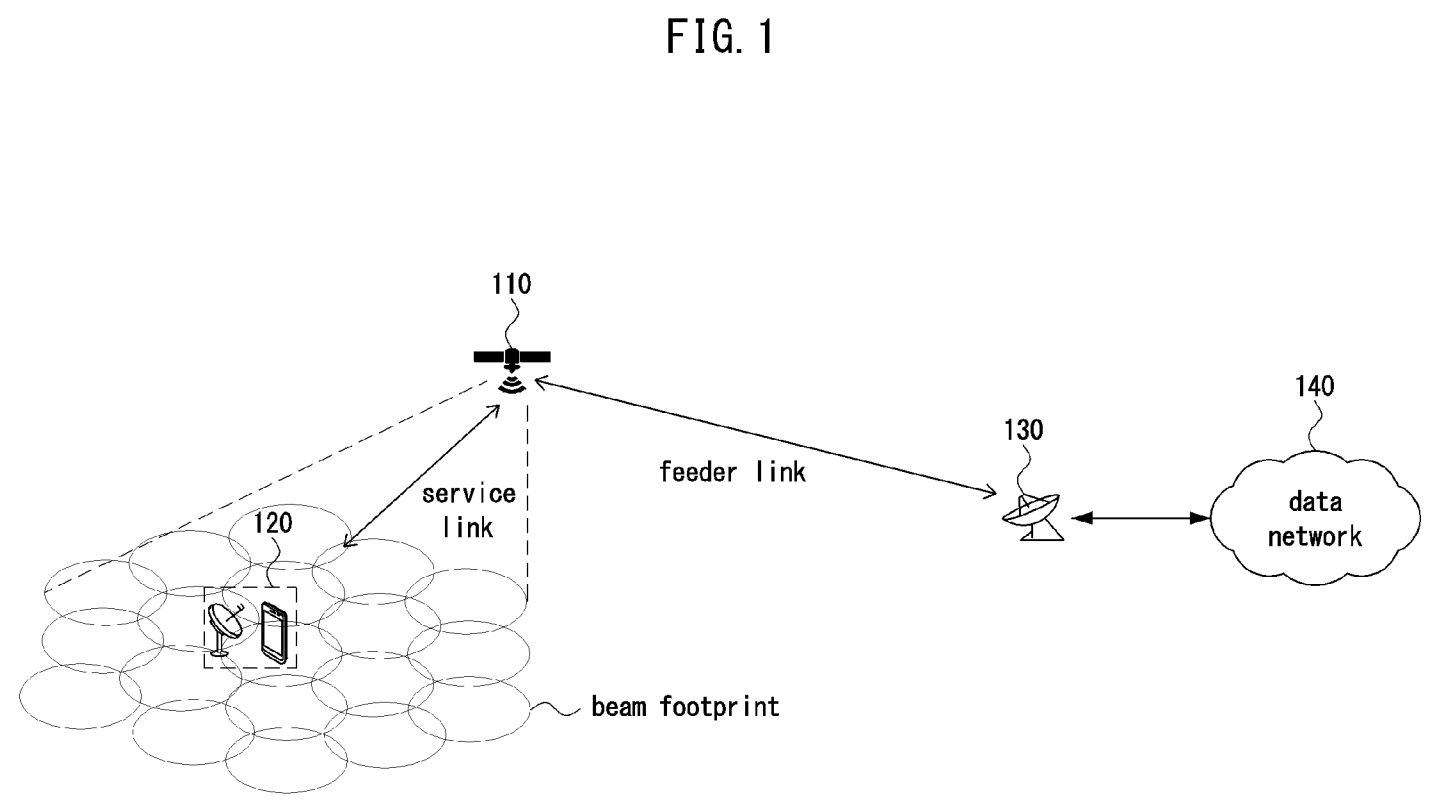

FIG. 1 is a conceptual diagram illustrating a first exemplary embodiment of a non-terrestrial network.

Referring to FIG. 1, the NTN may include a satellite 110, communication node 120, gateway 130, data network 140, and the like. The NTN shown in FIG. 1 may be a transparent payload-based NTN. The satellite 110 may be a low earth orbit (LEO) satellite, medium earth orbit (MEO) satellite, geostationary earth orbit (GEO) satellite, high elliptical orbit (HEO) satellite, or unmanned aircraft system (UAS) platform. The UAS platform may include a high-altitude platform station (HAPS).

The communication node 120 may include a terrestrial communication node (e.g., user equipment (UE) or terminal) and a non-terrestrial communication node (e.g., airplane, drone, etc.). A service link may be established between the satellite 110 and the communication node 120, and the service link may be a radio link. The satellite 110 may provide communication services to the communication node 120 using one or more beams. A footprint shape of a beam of the satellite 110 may be elliptical.

The communication node 120 may perform communications (e.g., downlink communication, uplink communication) with the satellite 110 by using the LTE technology and/or NR technology. The communications between satellite 110 and the communication node 120 may be performed using an NR-Uu interface. If dual connectivity (DC) is supported, the communication node 120 may be connected to the satellite 110 as well as another base station (e.g., base station supporting LTE and/or NR functions), and may perform DC operations based on the techniques defined in the LTE and/or NR technical specifications.

The gateway 130 may be located on the ground, and a feeder link may be established between the satellite 110 and the gateway 130. The feeder link may be a radio link. The gateway 130 may be referred to as a 'NTN gateway'. Communications between the satellite 110 and the gateway 130 may be performed based on an NR-Uu interface or a satellite radio interface (SRI). The gateway 130 may be connected to the data network 140. A 'core network' may exist between the gateway 130 and the data network 140. In this case, the gateway 130 may be connected to the core network, and the core network may be connected to the data network 140. The core network may support the NR technology. For example, the core network may include an access and mobility management function (AMF), user plane function (UPF), session management function (SMF), and the like. Communications between the gateway 130 and the core network may be performed based on an NG-C/U interface.

Alternatively, a base station and the core network may exist between the gateway 130 and the data network 140. In this case, the gateway 130 may be connected to the base station, the base station may be connected to the core network, and the core network may be connected to the data network 140. The base station and core network may support the NR technology. Communications between the gateway 130 and the base station may be performed based on an NR-Uu interface, and communications between the base station and the core network (e.g., AMF, UPF, SMF, etc.) may be performed based on an NG-C/U interface.

Figure 2:
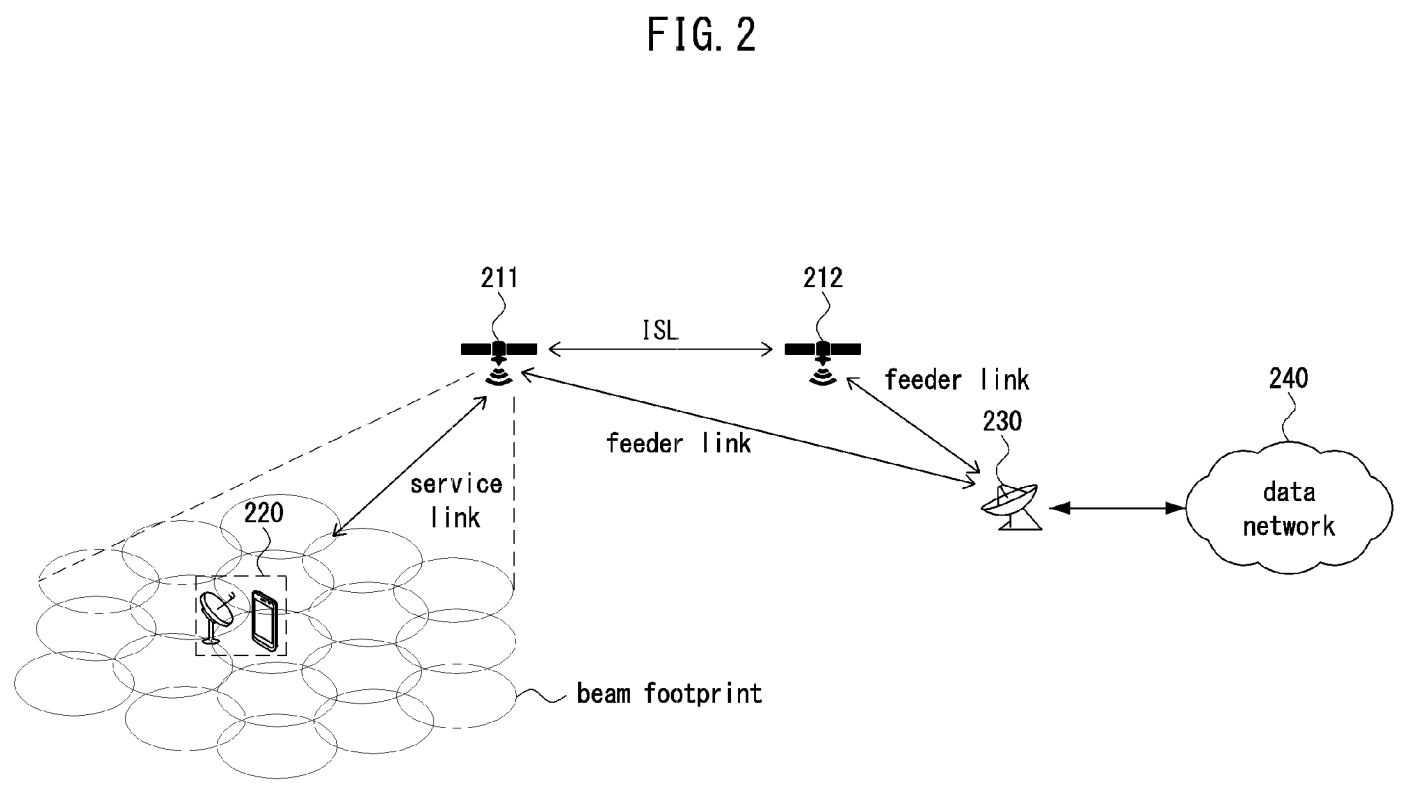

FIG. 2 is a conceptual diagram illustrating a second exemplary embodiment of a non-terrestrial network.

Referring to FIG. 2, the NTN may include a satellite #1 211, satellite #2 212, communication node 220, gateway 230, data network 240, and the like. The NTN shown in FIG. 2 may be a regenerative payload-based NTN. For example, each of the satellites #1 and #2 may perform a regenerative operation (e.g., demodulation operation, decoding operation, re-encoding operation, re-modulation operation, and/or filtering operation) on a payload received from another entity (e.g., communication node 220, gateway 230) constituting the NTN, and transmit a regenerated payload.

Each of the satellites #1 and #2 may be an LEO satellite, MEO satellite, GEO satellite, HEO satellite, or UAS platform. The UAS platform may include a HAPS. The satellite #1 may be connected to the satellite #2, and an inter-satellite link (ISL) may be established between the satellite #1 and the satellite #2. The ISL may operate in a radio frequency (RF) band or an optical band. The ISL may be optional. The communication node 220 may include a terrestrial communication node (e.g., UE or terminal) and a non-terrestrial communication node (e.g., airplane, drone, etc.). A service link (e.g., radio link) may be established between the satellite #1 and the communication node 220. The satellite #1 may provide communication services to the communication node 220 using one or more beams.

The communication node 220 may perform communications (e.g., downlink communication, uplink communication) with the satellite #1 using the LTE technology and/or NR technology. The communications between the satellite #1 and the communication node 220 may be performed using an NR-Uu interface. When DC is supported, the communication node 220 may be connected to the satellite #1 as well as another base station (e.g., base stations supporting LTE and/or NR functions) and perform DC operations based on the techniques defined in the LTE and/or NR technical specifications.

The gateway 230 may be located on the ground, a feeder link may be established between the satellite #1 and the gateway 230, and a feeder link may be established between the satellite #2 and the gateway 230. The feeder link may be a radio link. When the ISL is not established between the satellite #1 and the satellite #2, the feeder link between the satellite #1 and the gateway 230 may be mandatory.

Communications between each of the satellites #1 and #2 and the gateway 230 may be performed based on an NR-Uu interface or SRI. The gateway 230 may be connected to the data network 240. A core network may exist between the gateway 230 and the data network 240. In this case, the gateway 230 may be connected to the core network, and the core network may be connected to the data network 240. The core network may support the NR technology. For example, the core network may include an AMF, UPF, SMF, and the like. Communications between the gateway 230 and the core network may be performed based on an NG-C/U interface.

Alternatively, a base station and the core network may exist between the gateway 230 and the data network 240. In this case, the gateway 230 may be connected to the base station, the base station may be connected to the core network, and the core network may be connected to the data network 240. The base station and core network may support the NR technology.

Communications between the gateway 230 and the base station may be performed based on an NR-Uu interface, and communications between the base station and the core network (e.g., AMF, UPF, SMF, etc.) may be performed based on an NG-C/U interface.

Meanwhile, entities (e.g., satellites, communication nodes, gateways, etc.) constituting the NTN shown in FIGS. 1 and 2 may be configured as follows.

FIG. 3 is a block diagram illustrating an exemplary embodiment of an entity constituting the NTN.

Referring to FIG. 3, an entity 300 may comprise at least one processor 310, a memory 320, and a transceiver 330 connected to the network for performing communications. Also, the entity 300 may further comprise an input interface device 340, an output interface device 350, a storage device 360, and the like. Each component included in the entity 300 may communicate with each other as connected through a bus 370.

However, each component included in the entity 300 may be connected to the processor 310 via an individual interface or a separate bus, rather than the common bus 370. For example, the processor 310 may be connected to at least one of the memory 320, the transceiver 330, the input interface device 340, the output interface device 350, and the storage device 360 via a dedicated interface.

The processor 310 may execute a program stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may be constituted by at least one of a volatile storage medium and a non-volatile storage medium. For example, the memory 320 may comprise at least one of read-only memory (ROM) and random access memory (RAM).

Meanwhile, scenarios in the NTN may be defined as shown in Table 1 below.

TABLE 1

|  | NTN shown in FIG. 1 | NTN shown in FIG. 2 |
| --- | --- | --- |
| GEO | Scenario A | Scenario B |
| LEO (steerable beams) | Scenario C1 | Scenario D1 |
| LEO (beams moving with the satellite) | Scenario C2 | Scenario D2 |

When the satellite 110 in the NTN shown in FIG. 1 is a GEO satellite (e.g., GEO satellite supporting transparent functions), this may be referred to as 'scenario A'. When the satellites #1 and #2 in the NTN shown in FIG. 2 are GEO satellites (e.g., GEO satellite supporting regenerative functions), this may be referred to as 'scenario B'.

When the satellite 110 in the NTN shown in FIG. 1 is an LEO satellite with steerable beams, it may be referred to as 'scenario C1'. When the satellite 110 in the NTN shown in FIG. 1 is an LEO satellite having beams moving with satellite, this may be referred to as 'scenario C2'. When the satellites #1 and #2 in the NTN shown in FIG. 2 are LEO satellites with steerable beams, this may be referred to as 'scenario D1'. When the satellites #1 and #2 in the NTN shown in FIG. 2 are LEO satellites having beams moving with the satellite, this may be referred to as 'scenario D2'. Parameters for the scenarios defined in Table 1 may be defined as shown in Table 2 below.

TABLE 2

| Scenarios | Scenario A and B | Scenario C & D |
| --- | --- | --- |
| Altitude | 35,786 km | 600 km<br>1,200 km |
| Spectrum (service link) | <6 GHz (e.g., 2 GHz)<br>>6 GHz (e.g., DL 20 GHz, UL 30 GHz) | |
| Max distance between satellite and user equipment at min elevation angle | 40,581 km | 1,932 km (600 km altitude)<br>3,131 km (1,200 km altitude) |
| Max Round Trip Delay (propagation delay only) | Scenario A: 541.46 ms (service and feeder links)<br>Scenario B: 270.73 ms (service link only) | Scenario C: (transparent payload: service and feeder links)<br>25.77 ms (600 km)<br>41.77 ms (1200 km)<br>Scenario D: (regenerative payload: service link only)<br>12.89 ms (600 km)<br>20.89 ms (1200 km) |
| Max variation of delay within a beam | 16 ms | 4.44 ms (600 km)<br>6.44 ms (1200 km) |
| Max differential delay within a cell (Note 6) | 10.3 ms | 3.12 ms and 3.18 ms for respectively 600 km and 1200 km |
| Service link | 3GPP defined New Radio | |
| Feeder link | 3GPP or non-3GPP defined Radio interface | |

In addition, in the scenarios defined in Table 1, delay constraints may be defined as shown in Table 3 below.

TABLE 3

|  | Scenario A | Scenario B | Scenario C1-2 | Scenario D1-2 |
| --- | --- | --- | --- | --- |
| Altitude | 35,786 km | | 600 km | |
| Maximum RTD in a radio interface between base station and UE | 541.75 ms (worst case) | 270.57 ms | 28.41 ms | 12.88 ms |

TABLE 3-continued

|  | Scenario A | Scenario B | Scenario C1-2 | Scenario D1-2 |
| --- | --- | --- | --- | --- |
| Minimum RTD in a radio interface between base station and UE | 477.14 ms | 238.57 ms | 8 ms | 4 ms |

Meanwhile, in the communication system, a terminal may acquire time and frequency synchronization of a cell to be accessed for cellular communication. In addition, the terminal may perform cell search to obtain a physical layer cell identifier (PCI) of the cell. Through the cell search process, the terminal may acquire necessary information for cell access by receiving a synchronization signal and a physical broadcast channel (PBCH) transmitted from a base station of the corresponding cell. At this time, the base station and the terminal may transmit and receive a plurality of beams. In this case, the base station may periodically transmit synchronization signals and PBCHs using different beams during a specific time period. Then, the terminal may receive the synchronization signals and PBCHs. In addition, the terminal may select a beam capable of providing the highest received signal power with reference to the received synchronization signals and PBCHs.

In addition, in the wide band communication system, the base station may divide a wide band frequency region into various bandwidths to reduce transmission/reception complexity and energy consumption of the terminal, and may partially allocate it to the terminal. Accordingly, the terminal may perform communications by using one bandwidth part from a candidate group of bandwidth parts allocated to the terminal.

For example, the communication system may define a primary synchronization signal (PSS) and a secondary synchronization signal (SSS) as synchronization signals. In addition, the communication system may define a synchronization signal/physical broadcast channel (SS/PBCH or SSB) block composed of the PSS, SSS, and PBCH. The base station may periodically transmit the SSBs. Then, the terminal may receive the SSB(s) from the base station to acquire necessary information for cell access.

Figure 4:
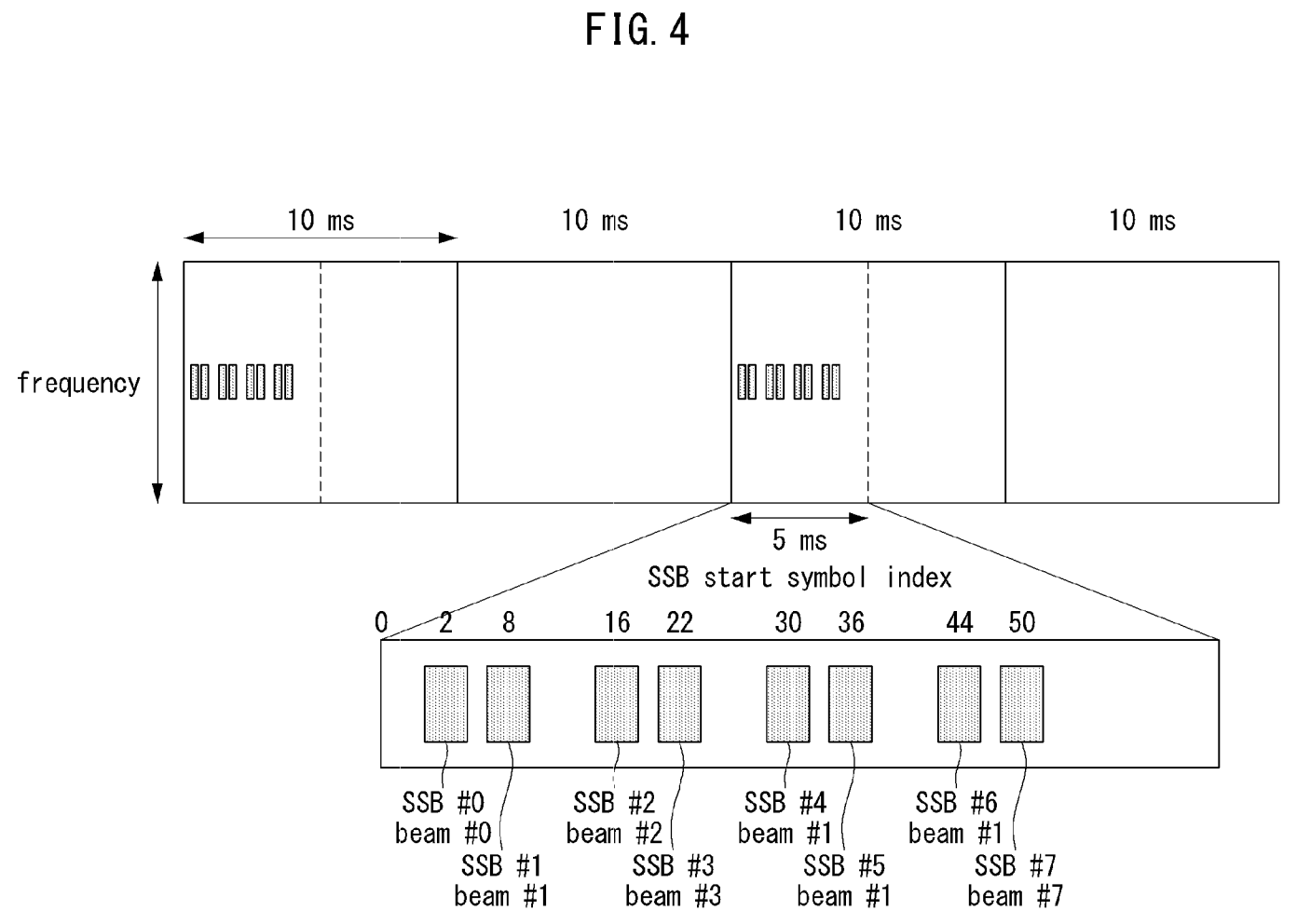

FIG. 4 is a conceptual diagram illustrating a first exemplary embodiment of a method for transmitting SSBs using a plurality of beams.

Referring to FIG. 4, in the method of transmitting SSBs using a plurality of beams, the base station may transmit 8 SSBs (e.g., SSB #0 to SSB #7) during an interval of 5 ms by using different beams (e.g., beam #0 to beam #3, beam #7). That is, the base station may transmit the SSB #0 using the beam #0. In this case, an SSB start symbol index may be 2. The base station may transmit the SSB #1 using the beam #1. In this case, an SSB start symbol index may be 8. The base station may transmit the SSB #2 using the beam #2. In this case, an SSB start symbol index may be 16. Subsequently, the base station may transmit the SSB #3 using the beam #3. In this case, an SSB start symbol index may be 22. The base station may transmit the SSB #4 using the beam #1. In this case, an SSB start symbol index may be 30. The base station may transmit the SSB #5 using the beam #1. In this case, an SSB start symbol index may be 36. The base station may transmit the SSB #6 using the beam #1. In this case, an SSB start symbol index may be 44. The base station may transmit the SSB #7 using the beam #7. In this case, an SSB start symbol index may be 50. In this manner, the base station may make the SSB start symbol indexes of the respective 8 SSBs different in the time domain, thereby making their transmission timings different.

In this case, a carrier frequency may be between 3 GHz and 6 GHz, and a subcarrier spacing (SCS) may be 15 kHz. The terminal may receive at least one of the SSB #0 to SSB #7 from the base station. Then, the terminal may identify a PCI by using the PSS and SSS in the received SSB. The terminal may acquire necessary information for the corresponding cell from the PBCH. The PBCH may include a 56-bit PBCH payload including the following information.

System frame number (10 bits)
  Subcarrier spacing (1 bit)
  SSB subcarrier offset (5 bits for a frequency range 1 (FR1) or 4 bits for a frequency range 2 (FR2))
  Demodulate reference signal (DMRS) type A position (DMRS-type-A-position) (1 bit)
  Physical downlink control channel (PDCCH) configuration for system information block type 1 (SIB1) (8 bits)
  Cell barring information flag (1 bit)
  Intra-frequency reselection allowed/not allowed flag (1 bit)
  SSB index (0 bit for FR1 or 3 bits for FR2)
  Half-frame bit (1 bit)
  Spare bits (1 bit)
  Reserved bits (2 bits for FR1 or 0 bit for FR2)
    Broadcast control channel (BCCH)-Broadcast channel (BCH)-message type indication (1 bit)
  Cyclic redundancy check (CRC) bits (24 bits)

Here, FR1 may mean a band of 6 GHz or below as a frequency range 1, and FR2 may mean a band of 24 GHz or above as a frequency range 2. In the case of FR1, the terminal may identify information on an SSB start symbol index by using 8 types of scrambling sequences of the PBCH. In addition, in the case of FR2, the terminal may identify up to 64 SSB start symbol indexes by using 8 types of scrambling sequences of the PBCH and 3-bit SSB index information transmitted on the PBCH together.

In the NR communication system, the base station may transmit only some SSBs among all SSBs. In this case, the terminal may receive an SIB1 including serving cell configuration common SIB information from the base station.

Here, the serving cell configuration common SIB information may include information on positions of SSBs within a burst (i.e., ssb-positions in burst). In addition, the information ssb-positions in burst may include 8 bits of 'in-one-group' information and 8 bits of 'group-presence' information. The terminal may identify the SSBs transmitted from the base station by using the 'in-one-group' information and the 'group-presence' information.

Meanwhile, the terminal may receive radio resource control (RRC) signaling including serving cell configuration common information. Here, the serving cell configuration common information may include information on positions of SSBs within a burst (i.e., ssb-positions in burst). In addition, the information ssb-positions in burst may include 4-bit short bitmap information, 8-bit medium bitmap information, or 64-bit long bitmap information. The terminal may identify the SSBs transmitted from the base station by using at least one of the short bitmap information, medium bitmap information, and long bitmap information Meanwhile, in a wide band wireless mobile communication system using a plurality of beams, each beam may be allocated to a spatially different area. Also, each beam may have a corresponding bandwidth part.

Figure 5:
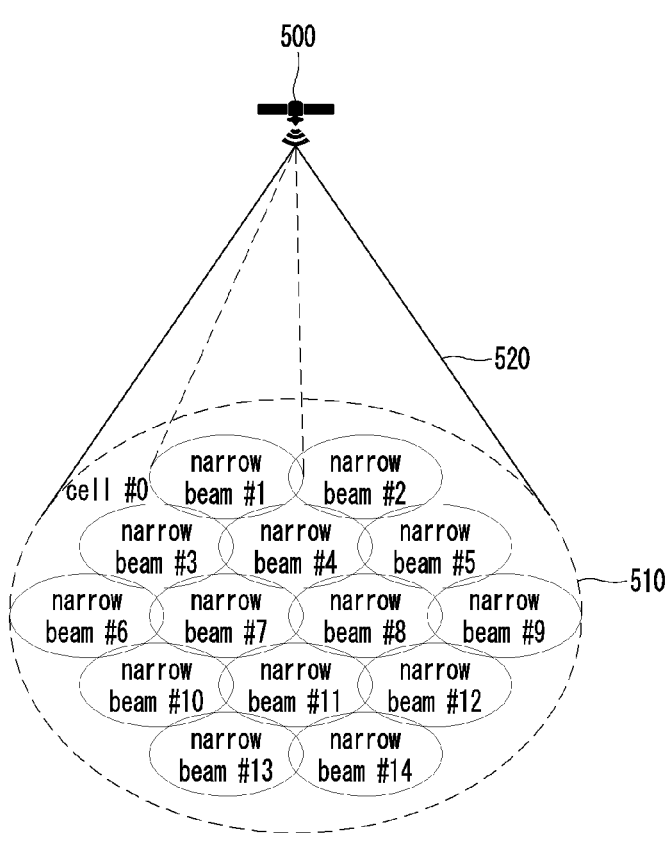
FIG. 5 is a conceptual diagram illustrating a first exemplary embodiment of a hierarchical beam structure.

FIG. 5 is a conceptual diagram illustrating a first exemplary embodiment of a hierarchical beam structure.

Referring to FIG. 5, a satellite 500 may transmit a wide beam 520 capable of covering the entire area of a cell (i.e., cell #0) 510 toward the cell 510. In addition, the satellite 500 may configure several sub-cells within the cell 510. In addition, the satellite 500 may transmit narrow beams (i.e., narrow beam #1 to narrow beam #14) capable of covering an area of each sub-cell toward each corresponding sub-cell. In this case, the satellite 500 may simultaneously transmit the wide beam 520 and the narrow beams (i.e., narrow beam #1 to narrow beam #14).

The terminal may receive the wide beam 520 to acquire time and frequency synchronization required to access the satellite, and may acquire information required to access the satellite. As such, the hierarchical beam structure may comprise the wide beam of the entire cell and narrow beams for sub-cells within the cell. In such the hierarchical beam structure, the satellite may transmit a signal by concentrating energy on the narrow beam. Accordingly, a reception performance of the terminal may be improved. On the other hand, the satellite may transmit the wide beam and the narrow beams together using a limited transmission power. As a result, a communication coverage may be reduced. Also, a frequency bandwidth for data transmission may be reduced.

Meanwhile, in the NR communication system, the satellite may transmit a plurality of beams toward the same spatial area. Accordingly, the satellite may disable transmission of some SSBs. However, when the satellite uses a narrow beam allocated to each of the sub-cells as shown in FIG. 5, transmission of the SSBs for all the narrow beams may be required to cover the entire area within the cell. In this case, the terminal may monitor all the SSBs for all the narrow beams within the cell. As a result, energy consumption of the terminal may increase. In addition, when the satellite transmits the wide beam and the narrow beams at the same time as shown in FIG. 5, it may be difficult to maintain the conventional cell coverage due to the limited transmission power.

According to the present disclosure, in the wireless mobile communication system using a plurality of beams, the satellite may simultaneously transmit a local wide beam and narrow beams. In addition, according to the present disclosure, the satellite may transmit SSBs mapped to the local wide beam and the narrow beams included in the local wide beam.

Figure 6:
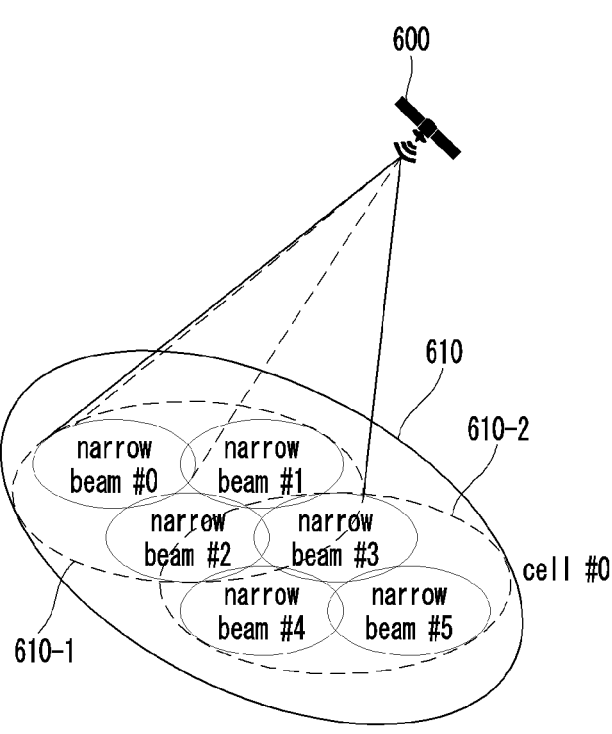
FIG. 6 is a conceptual diagram illustrating a second exemplary embodiment of a hierarchical beam structure.

FIG. 6 is a conceptual diagram illustrating a second exemplary embodiment of a hierarchical beam structure.

Referring to FIG. 6, in a hierarchical beam structure, a satellite 600 may configure a first local cell and a second local cell within a cell (i.e., cell #0) 610. In addition, the satellite 600 may configure a first local wide beam 610-1 capable of covering the first local cell for the first local cell. In addition, the satellite 600 may configure a second local wide beam 610-2 capable of covering the second local cell for the second local cell. Here, the local wide beam may be a first type beam.

Meanwhile, the satellite 600 may configure a plurality of sub-divided sub-cells (e.g., first to third sub-cells) within the first local cell. In addition, the satellite 600 may configure a narrow beam #0 capable of covering the first sub-cell for the first sub-cell. In addition, the satellite 600 may configure a narrow beam #1 capable of covering the second sub-cell for the second sub-cell. In addition, the satellite 600 may configure a narrow beam #2 capable of covering the third sub-cell for the third sub-cell. Then, the satellite 600 may configure a plurality of sub-divided sub-cells (e.g., fourth to sixth sub-cells) within the second local cell. In addition, the satellite 600 may configure a narrow beam #3 capable of covering the fourth sub-cell for the fourth sub-cell. In addition, the satellite 600 may configure a narrow beam #4 capable of covering the fifth sub-cell for the fifth sub-cell. In addition, the satellite 600 may configure a narrow beam #5 capable of covering the sixth sub-cell for the sixth sub-cell. Here, the narrow beam may be a second type beam.

As such, the satellite 600 may cover the communication area within the cell (i.e., cell #0) using the plurality of local wide beams 610-1 and 610-2. In addition, the satellite 600 may cover a communication area within each local cell using the plurality of narrow beams (i.e., narrow beam #0 to narrow beam #5). The satellite 600 may use the hierarchical structure in which the communication area within the cell (i.e., cell #0) is covered using the plurality of local wide beams 610-1 and 610-2, and the communication area within each of the local wide beams 610-1 and 610-2 is covered using the plurality of narrow beams (e.g., narrow beams #0 to #5). In this case, the number of sub-cells constituting the first local cell may be the same as the number of sub-cells constituting the second local cell. In this case, the satellite 600 may transmit SSBs respectively mapped to the local wide beam and the narrow beams, as shown in FIG. 7.

Figure 7:
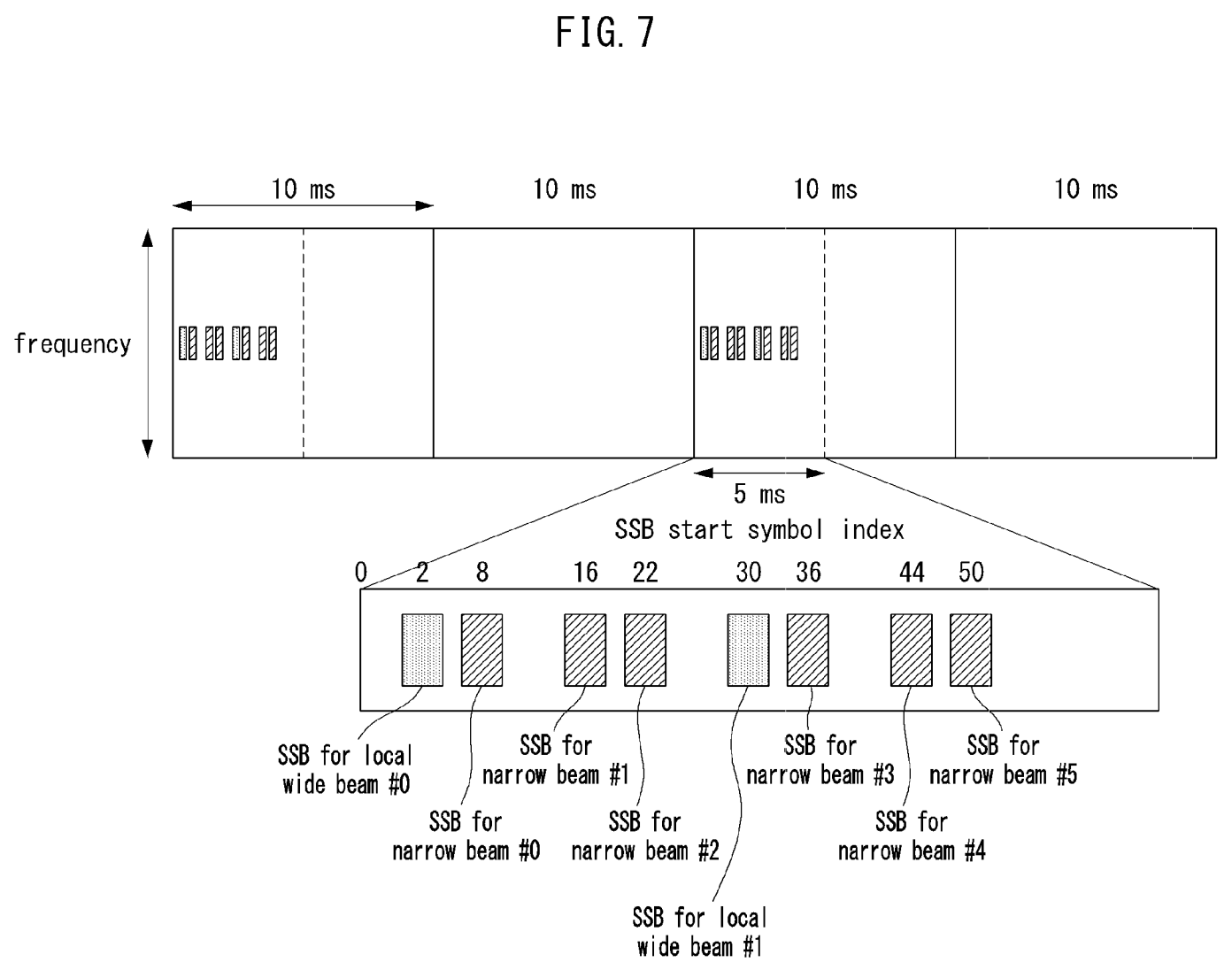

FIG. 7 is a conceptual diagram illustrating a first exemplary embodiment of a method for transmitting SSBs in a hierarchical beam structure.

Referring to FIG. 7, a satellite may configure a first SSB in a first local cell. In addition, the satellite may continuously configure second to fourth SSBs in sub-cells belonging to the first local cell. In this case, the satellite may configure a transmission timing of the first SSB to be earlier than transmission timings of the second to fourth SSBs. In addition, the satellite may sequentially configure the transmission timings of the second to fourth SSBs to be consecutive with the transmission timing of the first SSB.

Accordingly, the satellite may first transmit the first SSB using the local wide beam #0 covering the first local cell. In addition, the satellite may sequentially transmit the second to fourth SSBs using the narrow beams #0 to #2 corresponding to the sub-cells belonging to the first local cell. That is, the satellite may first transmit the first SSB using the local wide beam #0, transmit the second SSB using the narrow beam #0, transmit the third SSB using the narrow beam #1, and transmit the fourth SSB using the narrow beam #2.

Meanwhile, the satellite may configure the fifth SSB in the second local cell. In addition, the satellite may continuously configure sixth to eighth SSBs in sub-cells belonging to the second local cell. In this case, the satellite may configure a transmission timing of the fifth SSB to be earlier than transmission timings of the sixth to eighth SSBs. In addition, the satellite may sequentially configure the transmission timings of the sixth to eighth SSBs to be consecutive with the transmission timing of the fifth SSB.

Accordingly, the satellite may first transmit the fifth SSB using the local wide beam #1 covering the second local cell. In addition, the satellite may continuously transmit the sixth to eighth SSBs using the narrow beams #3 to #5 corresponding to the sub-cells belonging to the second local cell. That is, the satellite may first transmit the fifth SSB using the local wide beam #1, transmit the sixth SSB using the narrow beam #3, transmit the seventh SSB using the narrow beam #4, and then transmit the eighth SSB using the narrow beam #5. In this case, for example, the satellite may transmit the first SSB by configuring it using an SSB start symbol index 2 of a frame, transmit the second SSB by configuring it using an SSB start symbol index 8 of the frame, transmit the third SSB by configuring it using an SSB start symbol index 16 of the frame, and transmit the fourth SSB by configuring it using an SSB start symbol index 22 of the frame. Then, for example, the satellite may transmit the fifth SSB by configuring it using an SSB start symbol index 30 of the frame, transmit the sixth SSB by configuring it using an SSB start symbol index 36 of the frame, transmit the seventh SSB by configuring it using an SSB start symbol index 44 of the frame, and transmit the eighth SSB by configuring it using an SSB start symbol index 50 of the frame.

As such, the satellite may map the SSBs of the local wide beam and the narrow beams within the local wide beam to the SSB start symbol indexes of the frame. In this case, the satellite may continuously configure the SSBs in the order of the SSB start symbol indexes. Accordingly, the satellite may configure the first SSB corresponding to the local wide beam #0 to the most advanced SSB start symbol index in the time domain. In addition, the satellite may configure the second to fourth SSBs corresponding to the narrow beams #0 to #2 to be located after the SSB start symbol index of the first SSB in the time domain. In addition, the satellite may configure the fifth SSB corresponding to the local wide beam #1 to the most advanced SSB start symbol index in the time domain except for the SSB start symbol indexes configured to the first SSB to the fourth SSB. In addition, the satellite may configure the sixth to eighth SSBs corresponding to the narrow beams #3 to #5 to be located after the SSB start symbol index of the fifth SSB in the time domain.

Meanwhile, a terminal within the cell of the satellite may acquire system information by first receiving the first SSB mapped to the local wide beam #0. Accordingly, when the terminal cannot successfully receive the first SSB, it may not receive the second to fourth SSBs mapped to the narrow beams #0 to #2 within the local wide beam #0. In this manner, when the terminal cannot successfully receive the first SSB, it may not receive the second to fourth SSBs mapped to the narrow beams #0 to #2 within the local wide beam #0, thereby reducing energy consumption thereof.

In addition, the terminal within the cell of the satellite may acquire system information by first receiving the fifth SSB mapped to the local wide beam #1. Accordingly, when the terminal cannot successfully receive the fifth SSB, it may not receive the sixth to eighth SSBs mapped to the narrow beams #3 to #5 within the local wide beam #1. In this manner, when the terminal cannot successfully receive the fifth SSB, it may not receive the sixth to eighth SSBs mapped to the narrow beams #3 to #5 within the local wide beam #1, thereby reducing energy consumption thereof.

Meanwhile, the satellite may variously configure at least one of the number of local wide beams within the cell (e.g., cell #0), the number of narrow beams configured to sub-cells belonging to each local cell, SSB transmission timings, or the number of SSBs according to a frequency band, subcarrier spacing, maximum transmission power, etc. of the system. In particular, the satellite may configure the number of local wide beams and the number of narrow beams mainly based on the limited transmission power.

Method 1: Transmission and Reception Method of SSB Transmission Timing Information Using SIB1

The satellite may transmit local wide beams and narrow beams to form a hierarchical beam structure. In this case, the satellite may inform the terminal of information on transmission timings of SSBs mapped to the local wide beams and information on transmission timings of SSBs mapped to the narrow beams by using information on positions of SSBs within a burst (i.e., ssb-positions in burst), which is included in service cell configuration common SIB information within the SIB1. Here, the information on the transmission timings of the SSBs mapped to the local wide beams may include information on transmission activation or deactivation of the SSBs mapped to the local wide beams. Also, the information on the transmission timings of the SSBs mapped to the narrow beams may include information on transmission activation or deactivation of the SSBs mapped to the narrow beams.

Here, the information ssb-positions in burst may include 8-bits of 'in-one-group' information and 8-bits of 'group-presence' information. Accordingly, the terminal may receive the in-one-group information and the group presence information to identify the transmission activation or deactivation of the SSBs transmitted from the satellite.

For example, the satellite may form a hierarchical beam structure by transmitting two local wide beams and six narrow beams as shown in FIG. 7. In this case, there may be eight SSB candidates. The satellite may set the first bit corresponding to the first SSB mapped to the local wide beam #0 to '1' in the 'in-one-group' information of 8 bits. In addition, the satellite may set the second to fourth bits corresponding to the second to fourth SSBs mapped to the narrow beams #0 to #2 belonging to the local wide beam #0 to '0'. In addition, the satellite may set the fifth bit corresponding to the fifth SSB mapped to the local wide beam #1 to '1' in the 'in-one-group' information of 8 bits. Also, the satellite may set the sixth to eighth bits corresponding to the sixth to eighth SSBs mapped to the narrow beams #3 to #5 belonging to the local wide beam #1 to '0'.

Accordingly, as an example, the 8-bit in-one-group information may be '10001000'. As such, the first bit information '1' from the left may mean the first SSB mapped to the local wide beam #0. The second to fourth bit information '000' from the left may mean the second to fourth SSBs mapped to the narrow beam #0, narrow beam #1, and narrow beam #2, respectively. The fifth bit information '1' from the left may mean the fifth SSB mapped to the local wide beam #1, and the sixth to eighth bit information '000' from the left may mean the sixth to eight SSBs mapped to the narrow beam #3, narrow beam #4, and narrow beam #5, respectively. The terminal may receive the in-one-group information '10001000' from the satellite, and may identify the number of bits marked with '1' and the number of bits marked with '0'. The terminal may recognize the number of local cells as 2 because the number of bits marked as '1' is 2. In addition, the terminal may recognize the number of sub-cells as 3 because the number of bits marked with '0' consecutive with '1' is 3. In this manner, the satellite may implicitly inform the terminal of the number of local cells and the number of sub-cells. Of course, the satellite may explicitly inform the terminal by transmitting information on the number of local cells and the number of sub-cells.

As another example, the satellite may transmit 8 local wide beams and 56 narrow beams to form a hierarchical beam structure. In this case, there may be a total of 64 SSB candidates. In this case, the satellite may use 8-bit in-one-group information and 8-bit group presence information together. The satellite may separate a total of 64 SSB candidates into 8 groups each having 8 SSBs. In this case, each group may include an SSB mapped to a local wide beam. Alternatively, each group may be mapped to a local wide beam. That is, each group may be mapped to a local cell.

In this case, the satellite may use the 8-bit group presence information as existence indicators of the 8 groups. To this end, the satellite may cause the first bit of the group-presence information to correspond to the existence of the first group, the second bit thereof to correspond to the existence of the second group, the third bit thereof to correspond to the existence of the third group, the fourth bit thereof to correspond to the existence of the fourth group, the fifth bit thereof to correspond to the existence of the fifth group, the sixth bit thereof to correspond to the existence of the sixth group, the seventh bit thereof to correspond to the existence of the seventh group, and the eighth bit thereof to correspond to the existence of the eighth group.

Accordingly, the satellite may set a bit of the group presence information corresponding to a group to '1' to indicate existence of an SSB mapped to a local wide beam belonging to the group. Alternatively, the satellite may set a bit of the group-presence information corresponding to a group to '0' to indicate absence of an SSB mapped to a local wide beam belonging to the group. As an example, a total of 64 SSB candidates may be represented as SSB #0 to SSB #63. The SSBs mapped to the local wide beams among the total 64 SSB candidates may be the SSB #0, SSB #8, SSB #16, SSB #24, SSB #32, SSB #40, SSB #48, and SSB #56. Then, the satellite may set the 8-bit group-presence information to 11111111.

In addition, the satellite may use 8-bit in-one-group information as an indicator of an SSB corresponding to a local wide beam within a group and indicators of SSBs corresponding to narrow beams within the group. In this case, the satellite may cause the first bit of the in-one-group information to correspond to the existence of the first SSB corresponding to the local wide beam within the group, the second bit thereof to correspond to the existence of the second SSB corresponding to the first narrow beam within the group, the third bit thereof to correspond to the existence of the third SSB corresponding to the second narrow beam within the group, the fourth bit thereof to correspond to the existence of the fourth SSB corresponding to the third narrow beam within the group, the fifth bit thereof to correspond to the existence of the fifth SSB corresponding to the fourth narrow beam within the group, the sixth bit thereof to correspond to the existence of the sixth SSB corresponding to the fifth narrow beam within the group, the seventh bit thereof to correspond to the existence of the seventh SSB corresponding to the sixth narrow beam within the group, and the eighth bit thereof to correspond to the existence of the eighth SSB corresponding to the seventh narrow beam within the group.

For example, the first to eighth groups may have one SSB corresponding to one local wide beam and seven SSBs corresponding to seven narrow beams, respectively. Accordingly, the satellite may set the first bit of 8 bits to '1' to indicate one SSB corresponding to one local wide beam. In addition, the satellite may set the second to eighth bits to '0' to indicate seven SSBs corresponding to seven narrow beams. As a result, for example, the satellite may set the 8-bit in-one-group information to '1000000'. As such, when the satellite uses the 8-bit in-one-group information and 8-bit group presence information, a total of 16-bit information may be used. Accordingly, the satellite cannot independently indicate the total of 64 SSBs.

As another example, the satellite may form a hierarchical beam structure with 8 local wide beams and 56 narrow beams. In this case, there may be a total of 64 SSB candidates. In this case, the satellite may use 8-bit in-one-group information and 8-bit group-presence information together. The satellite may separate the total of 64 SSB candidates into 16 groups each having 4 SSBs. In this case, the eight groups may include SSBs mapped to local wide beams. However, the remaining 8 groups may not include SSBs mapped to the local wide beam.

In this case, the satellite may continuously represent the 8-bit group-presence information and the 8-bit in-one-group information to use them as indicators of 16 groups. To this end, when the group presence information and the in-one-group information are continuously represented, the satellite may cause the first bit of the group-presence information to correspond to the first group, the second bit thereof to correspond to the second group, the third bit thereof to correspond to the third group, the fourth bit thereof to correspond to the fourth group, the fifth bit thereof to correspond to the fifth group, the sixth bit thereof to correspond to the sixth group, the seventh bit thereof to correspond to the seventh group, and the eighth bit thereof to correspond to the eighth group. In addition, when the group-presence information and the in-one-group information are continuously represented, the satellite may cause the first bit of the in-one-group information consecutive with the group-presence information to correspond to the ninth group, the second bit thereof to correspond to the tenth group, the third bit thereof to correspond to the eleventh group, the fourth bit thereof to correspond to the twelfth group, the fifth bit thereof to correspond to the thirteenth group, the sixth bit thereof to correspond to the fourteenth group, the seventh bit thereof to correspond to the fifteenth group, and the eighth bit thereof to correspond to the sixteenth group.

Accordingly, the satellite may set a bit of the group presence information or the in-one-group information corresponding to a group to '1' to indicate existence of an SSB mapped to a local wide beam within the group. Alternatively, the satellite may set a bit of the group-presence information or the in-one-group information corresponding to a group to '0' to indicate absence of an SSB mapped to a local wide beam within the group. As an example, a total of 64 SSB candidates may be represented as SSB #0 to SSB #63. The SSBs mapped to the local wide beams among the total 64 SSB candidates may be the SSB #0, SSB #8, SSB #16, SSB #24, SSB #32, SSB #40, SSB #48, and SSB #56. Then, the satellite may set the 8-bit group-presence information to '10101010'. In addition, the satellite may set the 8-bit in-one-group information to '10101010'.

As such, the satellite may generate 16 bits in the order of the 8-bit in-one-group information and the 8-bit group-presence information, and it may be assumed that the bits indicating the SSB groups start from the left. In this case, the satellite may use a total of 16 bits of information by using the 8 bits of the in-one-group information and 8 bits of the group-presence information. Accordingly, the satellite cannot independently indicate the total of 64 SSBs.

Method 2: Transmission and Reception Method of SSB Transmission Timing Information Using RRC Signaling The satellite may simultaneously transmit local wide beams and narrow beams to form a hierarchical beam structure. In this case, the satellite may inform the terminal of information on transmission timings of SSBs mapped to the local wide beams and information on transmission timings of SSBs mapped to the narrow beams by using information on positions of SSBs within a burst (i.e., ssb-positions in burst), which is included in service cell configuration common information of RRC signaling. Here, the information on the transmission timings of the SSBs mapped to the local wide beams may include information on transmission activation or deactivation of the SSBs mapped to the local wide beams. Also, the information on the transmission timings of the SSBs mapped to the narrow beams may include information on transmission activation or deactivation of the SSBs mapped to the narrow beams. Here, the information ssb-positions in burst may include a 4-bit short bitmap, 8-bit medium bitmap, or 64-bit long bitmap. The satellite may use at least one of the 4-bit short bitmap, 8-bit medium bitmap, or 64-bit long bitmap based on a frequency band, subcarrier spacing, and/or the like of the system.

For example, the satellite may form a hierarchical beam structure by transmitting two local wide beams and six narrow beams as shown in FIG. 7. Accordingly, there may be eight SSB candidates. The satellite may set the first bit corresponding to the first SSB mapped to the local wide beam #0 to '1' in the 8-bit medium bitmap. In addition, the satellite may set the second to fourth bits corresponding to the second to fourth SSBs mapped to the narrow beams #0 to #2 belonging to the first local wide beam to '0' in the 8-bit medium bitmap. In addition, the satellite may set the fifth bit corresponding to the fifth SSB mapped to the local wide beam #1 to '1' in the 8-bit medium bitmap. In addition, the satellite may set the sixth to eighth bits corresponding to the sixth to eighth SSBs mapped to the narrow beams #3 to #5 belonging to the local wide beam #1 to '0' in the 8-bit medium bitmap. Accordingly, for example, the 8-bit medium bitmap may be set to '10001000'. As such, the first bit information '1' from the left may mean the first SSB mapped to the local wide beam #0. In addition, the second to fourth bits of information '000' from the left may mean the second to fourth SSBs mapped to the narrow beam #0, narrow beam #1, and narrow beam #2, respectively. The fifth bit information '1' from the left may mean the fifth SSB mapped to the local wide beam #1, and the sixth to the eighth bits '000' from the left may mean the narrow beam #3, narrow beam #4, and narrow beam #5, respectively.

The terminal may receive the medium bitmap '10001000' from the satellite, and may identify the number of bits marked with '1' and the number of bits marked with '0'. The terminal may recognize the number of local cells as 2 because the number of bits marked as '1' is 2. In addition, the terminal may recognize the number of sub-cells as 3 because the number of bits marked with '0' consecutive with '1' is 3. In this manner, the satellite may implicitly inform the terminal of the number of local cells and the number of sub-cells. Of course, the satellite may explicitly inform the terminal by transmitting information on the number of local cells and the number of sub-cells.

Meanwhile, as another example, the satellite may transmit 8 local wide beams and 56 narrow beams to form a hierarchical beam structure. In this case, there may be a total of 64 SSB candidates. In this case, the satellite may use a 64-bit long bitmap. The satellite may set the first bit corresponding to the first SSB mapped to the local wide beam #0 to '1' in the 64-bit long bitmap. In addition, the satellite may set the second to eighth bits corresponding to the second to eighth SSBs mapped to the narrow beams #0 to #6 belonging to the local wide beam #0 to '0' in the 64-bit long bitmap. In addition, the satellite may set the ninth bit corresponding to the ninth SSB mapped to the local wide beam #1 to '1' in the 64-bit long bitmap. In addition, the satellite may set the tenth to sixteenth bits corresponding to the tenth to sixteenth SSBs mapped to the narrow beams #7 to #13 belonging to the local wide beam #1 to '0' in the 64-bit long bitmap.

In addition, the satellite may set the seventeenth bit corresponding to the seventeenth SSB mapped to the local wide beam #2 to '1' in the 64-bit long bitmap. In addition, the satellite may set the $18^{th}$ to $24^{th}$ bits corresponding to the $18^{th}$ to $24^{th}$ SSBs mapped to the narrow beams #14 to #20 belonging to the local wide beam #2 to '0' in the 64-bit long bitmap. In addition, the satellite may set the twenty-fifth bit corresponding to the twenty-fifth SSB mapped to the local wide beam #3 to '1' in the 64-bit long bitmap. In addition, the satellite may set the $26^{th}$ to $32^{nd}$ bits corresponding to the $26^{th}$ to $32^{nd}$ SSBs mapped to the narrow beams #21 to #27 belonging to the local wide beam #3 to '0' in the 64-bit long bitmap.

In addition, the satellite may set the $33^{rd}$ bit corresponding to the $33^{rd}$ SSB mapped to the local wide beam #4 to '1' in the 64-bit long bitmap. In addition, the satellite may set the $34^{th}$ to $40^{th}$ bits corresponding to the $34^{th}$ to $40^{th}$ SSBs mapped to the narrow beams #28 to #34 belonging to the local wide beam #4 to '0' in the 64-bit long bitmap. In addition, the satellite may set the $41^{st}$ bit corresponding to the $41^{st}$ SSB mapped to the local wide beam #5 to '1' in the 64-bit long bitmap. In addition, the satellite may set the $42^{nd}$ to $48^{th}$ bits corresponding to the $42^{nd}$ to $48^{th}$ SSBs mapped to the narrow beams #35 to #41 belonging to the local wide beam #5 to '0' in the 64-bit long bitmap.

In addition, the satellite may set the $49^{th}$ bit corresponding to the $49^{th}$ SSB mapped to the local wide beam #6 to '1' in the 64-bit long bitmap. In addition, the satellite may set the $50^{th}$ to $56^{th}$ bits corresponding to the $50^{th}$ to $56^{th}$ SSBs mapped to the narrow beams #42 to #48 belonging to the local wide beam #6 to '0' in the 64-bit long bitmap. In addition, the satellite may set the $57^{th}$ bit corresponding to the $57^{th}$ SSB mapped to the local wide beam #7 to '1' in the 64-bit long bitmap. In addition, the satellite may set the $58^{th}$ to $64^{th}$ bits corresponding to the $58^{th}$ to to $64^{th}$ SSBs mapped to the narrow beams #49 to #55 belonging to the local wide beam #7 to '0' in the 64-bit long bitmap.

Accordingly, the satellite may set the total of 64 SSB candidates as SSB #0 to SSB #63. In addition, the satellite may configure the SSBs mapped to the local wide beams as the SSB #0, SSB #8, SSB #16, SSB #24, SSB #32, SSB #40, SSB #48, and SSB #56. In this case, the 64-bit long bitmap may be set to '10000000100000010000000100000-00100000001000000010000000010000000'.

In this case, the terminal may receive the long bitmap from the satellite, and may identify the number of bits marked with '1' and the number of bits marked with '0'. The terminal may recognize the number of local cells as 8 because the number of bits marked as '1' is 8. In addition, the terminal may recognize the number of sub-cells as 7 because the number of bits marked with '0' consecutive with '1' is 7. In this manner, the satellite may implicitly inform the terminal of the number of local cells and the number of sub-cells. Of course, the satellite may explicitly inform the terminal by transmitting information on the number of local cells and the number of sub-cells.

In each of the examples described above, the number of narrow beams belonging to each local wide beam may vary. In addition, in each of the examples described above, when the terminal cannot receive the SSB mapped to the local wide beam, it may not receive the SSB mapped to the narrow beam belonging to the corresponding local wide beam, which is transmitted immediately thereafter. That is, the terminal may not attempt to receive the SSB corresponding to the narrow beam until it receives the SSB mapped to another local wide beam transmitted next time. According to the present disclosure, the satellite may perform hierarchical beam management using the SSBs by a combination of the above-described methods. These above-described methods may be applied to various systems supporting hierarchical beam management.

Figure 8:
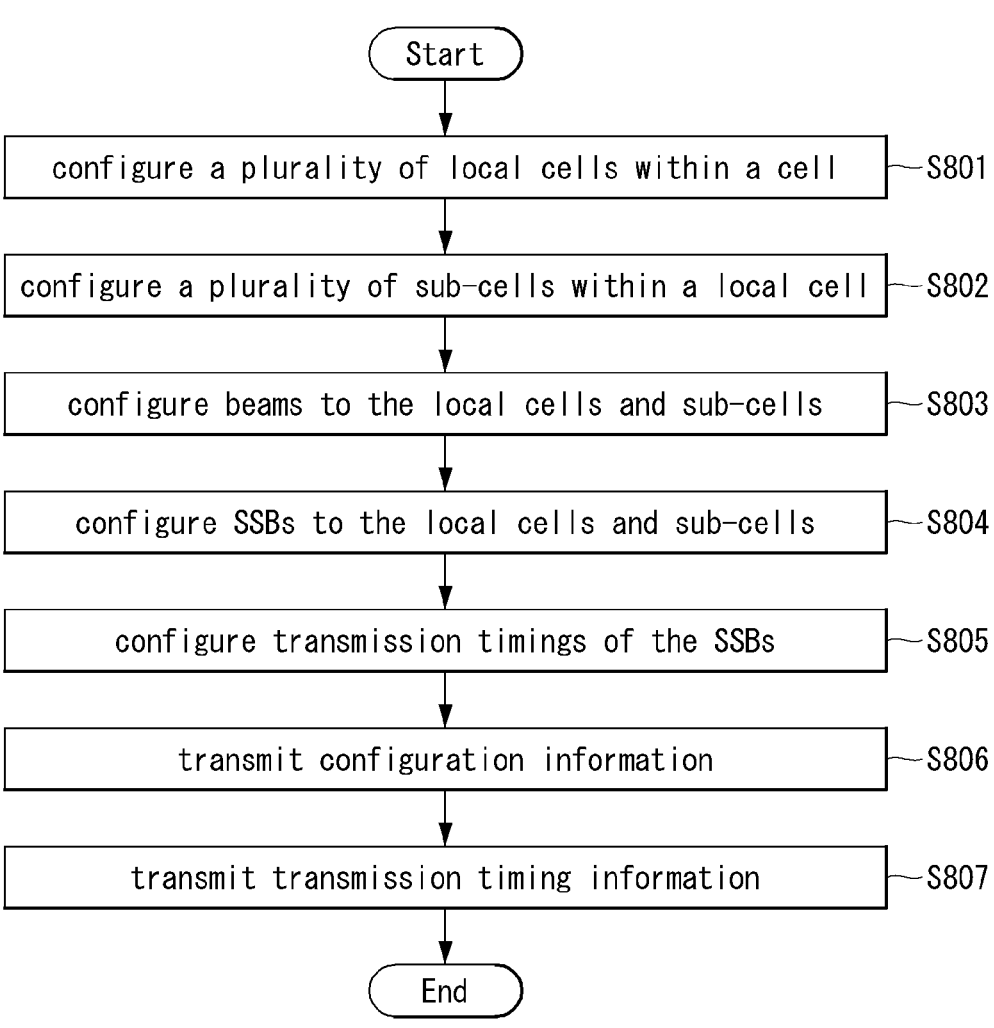
FIG. 8 is a flow chart illustrating a first exemplary embodiment of a beam management method of a satellite in a communication system.

FIG. 8 is a flow chart illustrating a first exemplary embodiment of a beam management method of a satellite in a communication system.

Referring to FIG. 8, in a beam management method of the satellite, the satellite may configure N local cells within a cell (e.g., cell #0) (S801). Here, N may be a natural number of 2 or more. Then, the satellite may configure a plurality of sub-cells within each local cell (S802). In this case, the satellite may equally configure each local cell to have M sub-cells. Here, M may be a natural number of 2 or more. In addition, the satellite may configure each local beam capable of covering each local cell in each local cell, and configure each sub-beam capable of covering each sub-cell in each sub-cell (S803). In this case, the width of each local beam may be wider than the width of each sub-beam.

The satellite may configure SSBs in each local cell, and may configure SSBs in sub-cells belonging to each local cell (S804). Then, the satellite may configure a transmission timing of the SSB configured in each local cell and transmission timings of the SSBs configured in the sub-cells belonging to each local cell (S805). In this case, the satellite may configure the transmission timing of the SSB configured in each local cell and the transmission timings of the SSBs configured in the sub-cells belonging to each local cell to be different from each other.

For example, the satellite may configure the transmission timing of the SSB configured in each local cell to be ahead of the transmission timings of the SSBs configured in sub-cells belonging to each local cell. In addition, the satellite may sequentially configure the transmission timings of the SSBs configured in the sub-cells belonging to each local cell in succession to the transmission timing of the SSB configured in each local cell. In other words, the satellite may configure an in-frame SSB start symbol index of the SSB configured in each local cell to precede in-frame SSB start symbol indexes of the SSBs configured in the sub-cells belonging to each local cell in the time domain. In addition, the satellite may configure the in-frame SSB start symbol indexes of the SSBs configured in sub-cells belonging to each local cell to be sequentially behind the in-frame SSB start symbol index of the SSB configured in each local cell.

In this case, the satellite may variously configure at least one of the number of local wide beams, the number of narrow beams, the SSB transmission timings, or the number of SSBs in the cell (e.g., cell #0) depending on a frequency band, subcarrier spacing, maximum transmission power, and/or the like of the system. In particular, the satellite may set the number of local wide beams and the number of narrow beams mainly based on the limited transmission power. In other words, the satellite may variously configure at least one of the number of local cells, the number of sub-cells, the SSB transmission timing, or the number of SSBs in the cell (e.g., cell #0) depending on the frequency band, subcarrier spacing, maximum transmission power, and/or the like of the system. In particular, the satellite may set the number of local cells and the number of sub-cells mainly based on the limited transmission power.

The satellite may transmit configuration information on at least one among the number of local wide beams, the number of narrow beams, and the number of SSBs to the terminal (S806). In other words, the satellite may transmit configuration information on at least one among the number of local cells, the number of sub-cells, and the number of SSBs to the terminal. Then, the terminal may receive the configuration information on at least one among the number of local wide beams, the number of narrow beams, and the number of SSBs from the satellite. That is, the terminal may receive the configuration information on at least one among the number of local cells, the number of sub-cells, and the number of SSBs from the satellite.

Meanwhile, the satellite may inform the terminal of information on transmission timings of the SSBs mapped to the local wide beams and information on transmission timings of the SSBs mapped to the narrow beams (S807). That is, the satellite may inform the terminal of information on transmission activation or deactivation of the SSBs mapped to the local wide beams and information on transmission activation or deactivation of the SSBs mapped to the narrow beams.

For example, the satellite may use the information ssb-positions in burst of the serving cell configuration common SIB information in the SIB1 to inform the terminal of information on transmission activation or deactivation of the SSBs mapped to the local wide beams and information on transmission activation or deactivation of the SSBs mapped to the narrow beams. Here, the information ssb-positions in burst may include 8-bit in-one-group information and 8-bit group presence information. Accordingly, the terminal may identify the transmission activation or deactivation of the SSBs transmitted from the satellite using the in-one-group information and the group-presence information. That is, the terminal may identify the transmission timings of the SSBs transmitted from the satellite using the in-one-group information and the group-presence information.

As another example, the satellite may use the information ssb-positions in burst of the serving cell configuration common information of RRC signaling to inform the terminal of information on transmission activation or deactivation of the SSBs mapped to the local wide beams and information on transmission activation or deactivation of the SSBs mapped to the narrow beams. Here, the in-burst SSB position information may include a 4-bit short, 8-bit medium bitmap, or 64-bit long bitmap. The satellite may use at least one of the 4-bit short bitmap, 8-bit medium bitmap information, or 64-bit long bitmap based on the frequency band, subcarrier spacing, and/or the like of the system.

Accordingly, the terminal may receive the information on transmission activation or deactivation of the SSBs mapped to the local wide beams and the information on transmission activation or deactivation of the SSBs mapped to the narrow beams from the satellite. In addition, the terminal may identify transmission activation or deactivation of the SSBs mapped to the local wide beams from the received information, and may identify transmission activation or deactivation of the SSBs mapped to the narrow beams from the received information. That is, the terminal may know the transmission timings of the SSBs transmitted from the satellite by using the bitmap information.

FIG. 9 is a flow chart illustrating a first exemplary embodiment of a beam management method of a terminal in a communication system.

Referring to FIG. 9, the satellite may transmit configuration information including the number of local cells and the number of sub-cells included in each local cell to the terminal. Then, the terminal may receive the configuration information including the number of local cells and the number of sub-cells included in each local cell from the satellite (S901). Accordingly, the terminal may identify the number of local cells and the number of sub-cells included in each local cell (S902).

Meanwhile, the satellite may configure the transmission timing of the SSB of each local cell and the transmission timings of the SSBs of the sub-cells belonging to each local cell. In addition, the satellite may transmit information on the transmission timing of the SSB of each local cell and information on the transmission timings of the SSBs of the sub-cells belonging to each local cell to the terminal. Then, the terminal may receive the information on the transmission timing of the SSB of each local cell and the information on the transmission timings of the SSBs of the sub-cells belonging to each local cell from the satellite (S903). Accordingly, the terminal may identify the transmission timing of the SSB of each local cell and the transmission timings of the SSBs of the sub-cells belonging to each local cell (S904). In this case, the terminal may identify the number of local cells and the number of sub-cells from the information on the transmission timing of the SSB of each local cell and the information on the transmission timings of the SSBs of the sub-cells belonging to each local cell.

Meanwhile, the satellite may transmit the SSB configured in the local cell at the corresponding transmission timing. In addition, the satellite may transmit the SSBs configured in the sub-cells belonging to the local cell at the configured transmission timings. Thereafter, the terminal may attempt to receive the SSB of the local cell at the identified transmission timing of each local cell. In this case, upon receiving the SSB of any one local cell, the terminal may attempt to receive the subsequent SSBs of the sub-cells belonging to the local cell. As a result, the terminal may receive the SSBs of the sub-cells belonging to the local cell (S905). Contrary to this, if the terminal fails to receive the SSB of any one local cell, it may not attempt to receive the subsequent SSBs of the sub-cells belonging to the local cell.

The terminal may acquire cell access information required for accessing the satellite from the received SSB of the local cell (S906). Then, the terminal may access the satellite by using the acquired cell access information (S907).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:

receiving, from a satellite, transmission timing information including information on a first transmission timing of a first synchronization signal block (SSB) of each of at least one local cell and information on second transmission timings of second SSBs of sub-cells belonging to each of the at least one local cell;

identifying the first transmission timing of the first SSB and the second transmission timings of the second SSBs based on the transmission timing information;

attempting to receive the second SSBs when the first SSB is received at the first transmission timing;

acquiring cell access information from the second SSBs by receiving the second SSBs; and accessing the satellite by using the acquired cell access information, wherein the sub-cells are configured by subdividing at least one local cell, and when the first SSB is not received at the first transmission timing of an SSB frame, the terminal does not attempt a reception operation for the second SSBs of the SSB frame, and wherein the first transmission timing of the first SSB is indicated by an SSB start symbol index of the first SSB within an SSB burst, and the second transmission timings of the second SSBs are indicated by SSB start symbol indexes of the second SSBs within the SSB burst.

2. The operation method according to claim 1, wherein when the first SSB is not received at the first transmission timing, the reception operation for the second SSBs is not performed in the terminal.

3. The operation method according to claim 1, further comprising:

calculating a number of the first transmission timing(s) of the first SSB(s) based on the transmission timing information;

calculating a number of the second transmission timings of the second SSBs based on the transmission timing information;

estimating a number of the at least one local cell by using the number of the first transmission timing(s) of the first SSB(s); and estimating a number of the sub-cells belonging to each of the at least one local cell by using the number of the second transmission timings of the second SSBs.

4. The operation method according to claim 1, wherein the transmission timing information is received through a system information block type 1 (SIB1) or a radio resource control (RRC) signaling message, and SSB position information included in the SIB1 or RRC signaling message indicates the transmission timing information.

5. The operation method according to claim 4, wherein the SSB position information includes 8-bit in-one-group information, an n-th bit of the in-one-group information indicates the first transmission timing, consecutive bits after the n-th bit indicate the second transmission timings, and n is one of natural numbers 0 to 7.

6. The operation method according to claim 4, wherein the SSB position information includes 8-bit in-one-group information and 8-bit group-presence information, a bit of the group-presence information indicates existence of a group comprising the first SSB and the second SSBs, a first bit of the in-one-group information indicates the first transmission timing, and consecutive bits after the first bit in the in-one-group information indicate the second transmission timings.

7. The operation method according to claim 4, wherein the SSB position information includes one bitmap among a 4-bit short bitmap, 8-bit medium bitmap, and 64-bit long bitmap, a bit of the one bitmap indicates the first transmission timing, and consecutive bits after the bit in the one bitmap indicate the second transmission timings.

8. A terminal comprising:

a processor;

a memory electronically communicating with the processor; and instructions stored in the memory, wherein when executed by the processor, the instructions cause the terminal to:

receive, from a satellite, transmission timing information including information on a first transmission timing of a first synchronization signal block (SSB) of each of at least one local cell and information on second transmission timings of second SSBs of sub-cells belonging to each of the at least one local cell;

identify the first transmission timing of the first SSB and the second transmission timings of the second SSBs based on the transmission timing information;

attempt to receive the second SSBs when the first SSB is received at the first transmission timing;

acquire cell access information from the second SSBs by receiving the second SSBs; and access the satellite by using the acquired cell access information, wherein the sub-cells are configured by subdividing at least one local cell, and when the first SSB is not received at the first transmission timing of an SSB frame, the terminal does not attempt a reception operation for the second SSBs of the SSB frame, and wherein the first transmission timing of the first SSB is indicated by an SSB start symbol index of the first SSB within an SSB burst, and the second transmission timings of the second SSBs are indicated by SSB start symbol indexes of the second SSBs within the SSB burst.

9. The terminal according to claim 8, wherein when the first SSB is not received at the first transmission timing, the reception operation for the second SSBs is not performed in the terminal.

10. The terminal according to claim 8, wherein the instructions further cause the terminal to:

calculate a number of the first transmission timing(s) of the first SSB(s) based on the transmission timing information;

calculate a number of the second transmission timings of the second SSBs based on the transmission timing information;

estimate a number of the at least one local cell by using the number of the first transmission timing(s) of the first SSB(s); and estimate a number of the sub-cells belonging to each of the at least one local cell by using the number of the second transmission timings of the second SSBs.

11. The terminal according to claim 8, wherein the transmission timing information is received through a system information block type 1 (SIB1) or a radio resource control (RRC) signaling message, and SSB position information included in the SIB1 or RRC signaling message indicates the transmission timing information.

12. An operation method of a satellite in a communication system, the operation method comprising:

configuring a first transmission timing of a first synchronization signal block (SSB) of each of at least one local cell and second transmission timings of second SSBs of sub-cells belonging to each of the at least one local cell;

transmitting, to a terminal, information on the first transmission timing of the first SSB and information on the second transmission timings of the second SSBs;

transmitting the first SSB at the first transmission timing of an SSB frame; and transmitting the second SSBs at the second transmission timings of the SSB frame, wherein the sub-cells are configured by subdividing at least one local cell, and wherein the first transmission timing of the first SSB is indicated by an SSB start symbol index of the first SSB within an SSB burst, and the second transmission timings of the second SSBs are indicated by SSB start symbol indexes of the second SSBs within the SSB burst.

13. The operation method according to claim 12, further comprising: before the configuring of the first transmission timing and the second transmission timings, configuring the at least one local cell within a cell; and configuring the sub-cells in each of the at least one local cell.

14. The operation method according to claim 12, further comprising:

configuring a first type beam in each of the at least one local cell; and configuring a second type beam in each of the sub-cells, wherein a width of the first type beam is wider than a width of the second type beam.

15. The operation method according to claim 12, wherein the configuring of the first transmission timing and the second transmission timings comprises:

configuring the first SSB in each of the at least one local cell;

configuring the second SSBs in the sub-cells belonging to the each of the at least one local cell; and configuring the first transmission timing and the second transmission timings to be different from each other.

16. The operation method according to claim 15, wherein in the configuring the first transmission timing and the second transmission timings to be different from each other, the satellite configures the first transmission timing to be ahead of the transmission timings of the second SSBs, and sequentially configures the second transmission timings consecutive with the first transmission timing.

17. The operation method according to claim 12, further comprising transmitting, to the terminal, information on a number of the at least one local cell and information on a number of sub-cells included in each of the at least one local cell.

18. The operation method according to claim 12, wherein the information on the first transmission timing(s) of the first SSB(s) is received through a system information block type 1 (SIB1) or a radio resource control (RRC) signaling message, SSB position information included in the SIB1 or RRC signaling message indicates the first transmission timing(s), the information on the second transmission timings of the second SSBs is received through the SIB1 or RRC signaling message, and SSB position information included in the SIB1 or RRC signaling message indicates the second transmission timings.

* * * * *